United States Patent
Gillner et al.

(10) Patent No.: US 6,914,224 B2
(45) Date of Patent: Jul. 5, 2005

(54) HEATED WINDOW

(75) Inventors: Manfred Gillner, Aachen (DE);
Jürgen Schmitz, Herzogenrath (DE);
Heinz-Erich Dickers, Pulheim (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/479,343

(22) PCT Filed: May 22, 2002

(86) PCT No.: PCT/FR02/01718
§ 371 (c)(1),
(2), (4) Date: Apr. 20, 2004

(87) PCT Pub. No.: WO02/098176
PCT Pub. Date: Dec. 5, 2002

(65) Prior Publication Data
US 2004/0159645 A1 Aug. 19, 2004

(30) Foreign Application Priority Data
Jun. 1, 2001 (DE) .......................... 101 26 869

(51) Int. Cl.⁷ ................................. H05B 3/06
(52) U.S. Cl. .................... 219/522; 219/202; 219/203
(58) Field of Search .................. 219/202, 203, 219/219, 522, 547, 497, 541, 476, 478, 538; 156/106, 295, 328; 338/306, 307, 308, 309; 52/171.2; 392/435, 432, 438, 439

(56) References Cited

U.S. PATENT DOCUMENTS

| | | | |
|---|---|---|---|
| 3,383,762 A | | 5/1968 | LeClercq |
| 3,974,359 A | * | 8/1976 | Orcutt et al. ............... 219/522 |
| 4,071,736 A | * | 1/1978 | Kamerling ................. 219/219 |
| 4,395,622 A | * | 7/1983 | Dran et al. ................. 219/522 |
| 4,396,826 A | * | 8/1983 | Orcutt et al. ............... 219/522 |
| 4,755,659 A | * | 7/1988 | Leon et al. ................. 219/547 |
| 4,894,513 A | * | 1/1990 | Koontz ....................... 219/203 |
| 4,994,650 A | * | 2/1991 | Koontz ....................... 219/497 |
| 5,434,384 A | * | 7/1995 | Koontz ....................... 219/203 |
| 5,445,694 A | * | 8/1995 | Gillner et al. .............. 156/106 |
| 5,627,509 A | * | 5/1997 | Gajewski et al. ....... 340/426.27 |
| 5,650,208 A | * | 7/1997 | Chaussade et al. ........... 428/38 |
| 5,824,993 A | * | 10/1998 | Chrysochoos et al. ...... 219/203 |
| 6,008,473 A | * | 12/1999 | Gillner et al. .............. 219/202 |
| 6,211,491 B1 | * | 4/2001 | Mazaki ....................... 219/203 |

FOREIGN PATENT DOCUMENTS

| | | |
|---|---|---|
| EP | 0 479 154 | 4/1992 |
| EP | 0 524 537 | 1/1993 |
| FR | 1 544 718 | 11/1968 |

* cited by examiner

Primary Examiner—Robin O. Evans
Assistant Examiner—Leonid M Fastovsky
(74) Attorney, Agent, or Firm—Oblon, Spivak, McClelland, Maier & Neustadt, P.C.

(57) ABSTRACT

A heated window including at least one rigid pane, at least two current busbars of different polarity placed substantially parallel close to one edge of the heated window at different distances from the edge, and linear heating resistors electrically connected thereto. The busbars lie sideways to the heating resistors and the heating resistors start from a first current busbar and, passing over the other current busbar while being insulated therefrom, in the direction of the window surface and in at least one loop, return toward the other current busbar and are electrically connected thereto.

15 Claims, 1 Drawing Sheet

HEATED WINDOW

Figure 1:
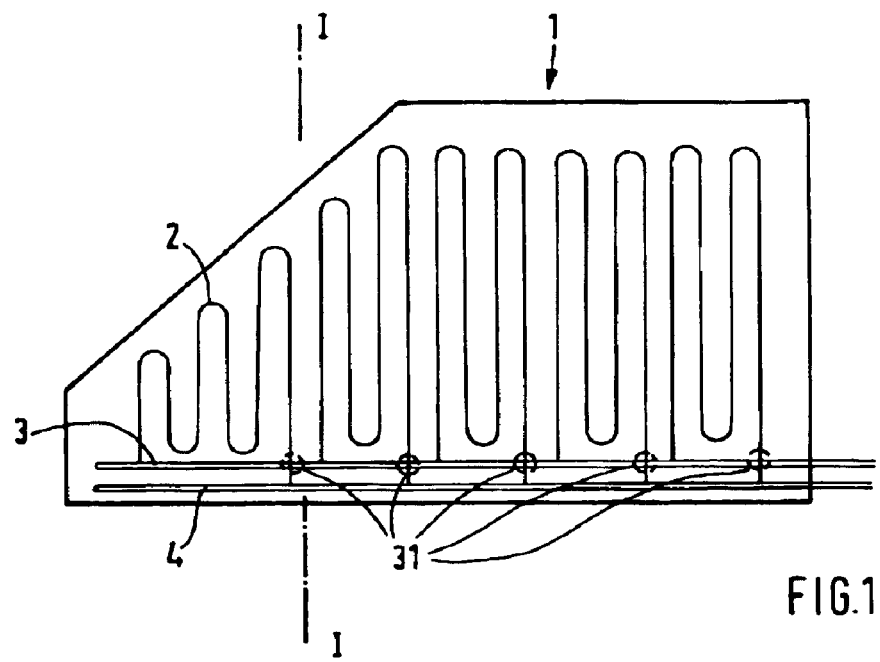

The invention relates to a heated window consisting of at least one rigid pane, at least two current busbars of different polarity placed substantially parallel close to one edge of the heated window at different distances from the edge, and linear heating resistors electrically connected thereto.

These features are known from German utility model DE 296 06 071 U1, which relates to a laminated window with electric heating, in which heating resistors are provided electrically mounted in parallel and embedded in the intermediate thermoplastic layer in the region of the rest position of the windshield wipers. Also, metal film strips acting as busbars connected to electrical power supply lines, and which are electrically connected to the heating resistors, are embedded in the intermediate thermoplastic layer. The busbars are arranged very close to each other and the heating resistors are placed, in the form of loops, between the busbars. In one embodiment, the heating resistors are arranged as U-shaped loops, one interleaved with the other in the horizontal direction and brazed to two ribbon-shaped current busbars. The current busbars are very close and parallel to each other in the region of one side edge of the windshield. The current busbar away from the edge of the windshield is only about half as long as the current busbar placed in the immediate proximity of the side edge, this current busbar being connected to the upper halves of the wire loops, and the other current busbar being connected to the lower halves of the wire loops.

A windshield with electric heating provided with a flat heater, with two current busbars placed at the opposite upper and lower edges of the window is known from EP 0 479 154 A1. The lower current busbar is provided in the middle with a current lead oriented perpendicularly to the edge of the window, therefore in the shape of a T. The upper current busbar is connected to two leads, which are placed along the two side edges. The two leads further extend along the lower edge of the window below the lower current busbar. The first lead transversely crosses, under electrical insulation, the perpendicular branch of the T and is electrically connected to the other lead. The other lead is also taken toward the lower edge of the window. Because of this arrangement, only two electrical connection lines are needed in the middle of the lower edge of the windshield.

The object of the invention is to produce another heated window with current busbars arranged close to one edge of the window.

According to the invention, this objective is achieved by the fact that the busbars lie sideways to the heating resistors and the heating resistors start from a first current busbar and, passing over the other current busbar while being insulated therefrom, in the direction of the window surface and in at least one loop, return toward the other current busbar and are electrically connected thereto. The characteristics of the secondary claims reveal the advantageous improvements of this object.

According to the invention, the heating resistors extend from one current busbar away from the edge in the direction of the face to be heated and they return back in a loop toward another current busbar close to the edge, crossing the current busbar away from the edge. The current busbars close to and away from the edge are arranged in the region of the same edge of the window. To prevent a short circuit, the heating resistor is electrically insulated from the current busbar in the region of the crossing. The heating resistors thus arranged form a heating field, which lies over a particular zone of the heated window and which is supplied with electrical energy by the pair of current busbars.

The invention is not limited to the fact that there is only a single heating field on the heated window. It may, for example, be beneficial to provide several heating fields, especially to produce different heating powers in particular zones. It is thus possible to imagine arranging two or more than two heating fields side by side in the face of the window. The respective pairs of current busbars, for example, for two heating fields, may be at the same edge of the window, the current leads coming from the upper edge for a first upper heating field, and from the lower edge for the other lower heating field. If the current lead must be effected from a single edge of the window, it is necessary to cross, in an insulated manner, more than one current busbar. In another variant, it is possible to use one current busbar as a common ground terminal for the two heating fields. Furthermore, it is possible to arrange the pairs of busbars for different heating fields at different side edges. The heating fields then cover zones of the heated window, which are arranged at a distance from each other, are contiguous or even are interleaved with each other.

In another variant of the heated window, the heating resistors form several loops, before returning to the other current busbar. The heating resistors therefore do not extend only from the busbar away from the edge over the width of the heating field to return again toward the busbar close to the edge, but they go back into at least another loop again over the width of the heating field toward the pair of busbars. Therefore there is always an odd number of conducting loops. For a specific heating resistor, which depends on the length of the conductor, on the cross section of the conductor and on the specific resistance of the material used, it is possible to adjust the heating power per unit area by choosing the number of loops, independently of the geometrical dimensions of the surface to be heated. The use of a greater number of loops has the additional advantage that the number of electrical connections, which in general must be produced by brazing, is smaller than when arranging the heating resistors in a single loop each time. It is thus possible to save on the number of working steps.

The heated windows according to the invention may be monolithic windows, in which the heating resistors are placed on one of their main faces. A known example of this type of window is supplied by motor vehicle windows or by toughened safety-glass windows, which are provided with heating resistors made of a conducting matrix. Normally, a conducting ceramic paste with a high silver content is screen printed in the shape desired for the heating conductors and the conducting busbars on the surface of the window for this purpose, and it is then baked. The conducting busbar away from the edge can be insulated from the conductor which crosses it by means of a dielectric matrix. For this purpose, the printing operation for the heating resistors and the busbars must be split into two steps. In a first step, the current busbar away from the edge is printed with the heating resistors, and the return branch of the loop of the heating conductor terminates slightly before the current busbar away from the edge. The second step follows, in which an insulating layer, for example a dielectric matrix to be baked, is arranged on this current busbar. Next, the current busbar close to the edge is printed, and the connecting conductors are placed at the same time toward the open ends of the loops of the heating conductors. The connecting conductors cross, in an insulated manner, the busbar away from the edge and close the electric circuit of each individual heating resistor loop.

A series of printed conducting and insulating layers is known from German patent DE 39 11 178 C2. In this case, an output antenna conductor is made in the form of a coaxial pseudoconductor with powerful shielding.

Apart from monolithic heated windows, the invention also comprises heated windows made of laminated glass, which consist of at least two rigid panes assembled to each other by adhesive bonding by means of an intermediate layer. In this case, the heating resistors are preferably composed of metal wires, which are embedded in the intermediate layer. However, it is also possible to manufacture a heated laminated window according to the invention by using the monolithic heated window described in order to form one of the individual panes. The surface with the heating resistors may just as well be placed on the inside as on the outside of the laminated glass. The individual panes may consist of glass or of plastic. The laminated windows may be composed of two or more panes of identical or different materials. Normally, an adhesive thermoplastic film, for example made of polyvinyl butyral, is used as an intermediate layer assembling the individual panes to each other.

The current busbars in the laminated windows, which may be heated by means of heating resistors embedded in the intermediate layer, normally consist of flat metal films made of tinned copper. There are also models which are further provided with an insulating coating made of polyimide. With a metal film strip of this sort acting as a current busbar away from the edge, a laminated window according to the invention may be easily manufactured by removing the insulator only at the locations where the heating resistors must be electrically connected to the current busbar. The current busbar close to the edge may be placed without an insulating coating or, where an insulated metal film strip is used, the insulator may also be removed at its locations of connection with the heating resistors.

To ensure that vision through the laminated window is hindered as little as possible, the heating wires must have a relatively small diameter of about 20 μm to 100 μm. Heating wires made of tungsten have proved to be suitable for this purpose. However, copper wires, which can be provided with a layer of a dark matt color in order to prevent metallic reflections, are also suitable to be used in the laminated window according to the invention. Wires with several layers are also known, which have a mechanically strong core which is enveloped by a metal which is a good conductor and/or easy to braze. The material for the wires and/or the diameter of the wires is chosen according to mechanical and electrical requirements associated with the desired heating field.

When the wires are straight and arranged in parallel at a short distance from each other, phenomena of diffraction on incidence of the light may occur under unfavorable circumstances. Such phenomena can be prevented by certain irregularities in the alignment of the heating wires, for example a wavy arrangement of the heating wires.

When the current busbars are only arranged close to a single side edge, the laminated window is suitable, for example, for use as a heated laminated window with free edges, therefore for example as a motor vehicle side window which can be opened. The current busbars can be arranged inside the well of the door and be masked by the bodywork or sealing elements.

Other details and advantages of the subject of the invention will emerge, without any intention of limitation, from the drawing of one embodiment and from its detailed description which follows.

Figure 2:
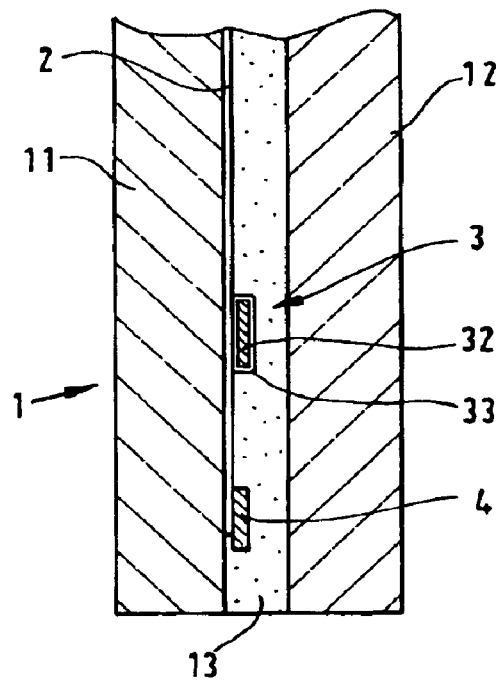

In the drawings, which constitute a simplified representation without a particular scale, FIG. 1 shows a laminated window according to the invention as a side window of a motor vehicle, in elevation; and FIG. 2 shows a section through the side window of FIG. 1 along the line I—I.

According to FIG. 1, a laminated window 1 is provided with heating wires 2 made of black lacquered copper, which are placed inside the laminated window 1 and whose diameter is about 85 μm. The heating wires 2 lie in the shape of a loop between the lower edge of the side window 1 in the fitted position and its upper edge. In order to supply it with electricity, a first end of each loop is connected to a current busbar 3 and the other end of the loop is connected to the current busbar 4. On the path toward the current busbar 4, the heating wires 2 must cross the current busbar 3 in the zones 31. In these zones 31, the heating wires 2 are electrically insulated from the current busbar 3. The two current busbars 3 and 4 are, like the heating wires 2, placed inside the laminated window 1 and are connected to the two poles of an on-board electrical network. Normally, there is a voltage of 12 V between the current busbars. The current supplied complies with the heating power needed per unit area, for which it is necessary to take into account the electrical resistance of the heating wires 2 and their mutual separation. In order to distribute the heating power constantly over the face of the laminated window 1, the length of the wires of the individual loops must also be as equal as possible, the other properties of the wires being equal. Consequently, for the laminated window shown in FIG. 1, the portion of wire which is in the region of the inclined edge and therefore of lower height has been arranged in a loop with five changes of direction, while each of the other portions of wire change direction only three times.

The current busbars 3 and 4 leave the laminated window 1 at the side and are connected in a known manner to the on-board network. For the car side window shown here, the part next to the lower edge of the window, in which the current busbars are located, is arranged inside the door well and is thus masked by the bodywork. Moreover, the normal masking of the current busbars using layers of an opaque color is not necessary in this case.

FIG. 2 shows a representation in section of the side window of FIG. 1 along the line I—I. The laminated window 1 is composed of two individual panes 11 and 12 with a thickness of about 2.1 mm, which are assembled to each other in a known manner by adhesive bonding with insertion of an intermediate thermoplastic layer 13 made of polyvinyl butyral. Before the assembly operation, the heating wires 2 and the current busbars 3 and 4 are embedded in the surface of the intermediate layer 13 using a method which is also known.

The current busbar 4 is composed of a tinned copper film and is mechanically and electrically connected to the heating wire 2 by brazing. In contrast, for the current busbar 3, a tinned copper film 32 is surrounded on all sides by an insulating coating 33 made of polyimide. The heating wire 2 can therefore cross the current busbar 3, where it will certainly touch it but nevertheless will have no electrical contact therewith. At the locations where the heating wire 2 is electrically connected to the current busbar 3, the insulating coating must be removed before encapsulation in the intermediate thermoplastic layer.

What is claimed is:

1. A heated window comprising:
   at least one rigid pane;
   at least two current busbars of different polarities placed substantially parallel close to one edge of the heated window at different distances from the edge; and at least two heating resistors having looped shapes electrically connected to the busbars, wherein the busbars lie sideways to the heating resistors and a first end of a first heating resistor is electrically connected to a first current busbar, the first heating resistor extends in a direction of the window surface and in at least one loop, returns toward a second current busbar and is electrically connected to the second current busbar, and a second end of the first heating resistor crosses the first busbar at an insulated portion and connects to the second bus bar.

2. The heated window as claimed in claim 1, wherein the heating resistors return toward the second current busbar after having formed more than one loop and are electrically connected to the second current busbar.

3. The heated window as claimed in claim 1, wherein the rigid pane comprises a glass pane and the heating resistors comprise a baked conducting ceramic matrix.

4. The heated window as claimed in claim 1, wherein the at least one rigid pane comprises a laminated window including at least two rigid panes assembled to each other by adhesive bonding by an intermediate layer.

5. The heated window as claimed in claim 4, wherein the heating resistors are embedded in the intermediate layer and the current busbars comprise strips of metal film.

6. The heated window as claimed in claim 5, wherein at least one metal film strip is surrounded with an insulating sheath, which is only broken in a region of the electrical connection with a heating resistor.

7. The heated window as claimed in claim 5, wherein the heating resistors comprise tungsten wire.

8. The heated window as claimed in claim 5, wherein the heating resistors comprise copper wire.

9. The heated window as claimed in claim 5, wherein the heating resistors comprise plural conducting materials, of a first mechanically strong metal and a second metal having a higher electrical conductivity.

10. The heated window as claimed in claim 5, wherein the heating resistors are embedded in the intermediate layer in a wavy arrangement.

11. The heated window as claimed in claim 5, wherein the heating resistors are embedded in the intermediate layer in a straight arrangement.

12. The heated window as claimed in claim 5, wherein at least one of the panes comprises glass.

13. The heated window as claimed in 5, wherein the intermediate layer comprises a thermoplastic polymer.

14. The heated window as claimed in 1, wherein the heated window comprises a motor vehicle side window that can be opened and the current busbars are arranged in a masked position.

15. The heated window as claimed in claim 13, wherein the thermoplastic polymer comprises polyvinyl butyral.

* * * * *